United States Patent
Vaidyanathaswami et al.

(10) Patent No.: US 10,982,960 B2
(45) Date of Patent: *Apr. 20, 2021

(54) SYSTEMS AND METHODS FOR REAL-TIME UPDATING OF ATTRIBUTES OF AN AREA AND STATUS OF DEVICES WITHIN THE AREA

(71) Applicant: Verizon Patent and Licensing Inc., Arlington, VA (US)

(72) Inventors: Rajaraman Vaidyanathaswami, Chennai (IN); Vaidyanathan Kalyanasundram, Chennai (IN); Richard Joel, Chennai (IN); Muthu Chandrasekaran, Puzhuthivakkam (IN); Dineshraj Gunasekaran, Chennai (IN); Vinetha Jagadeesan, Chennai (IN); Anil Kumar, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/590,011

(22) Filed: Oct. 1, 2019

(65) Prior Publication Data

US 2020/0080847 A1 Mar. 12, 2020

Related U.S. Application Data

(63) Continuation of application No. 16/129,471, filed on Sep. 12, 2018, now Pat. No. 10,473,468.

(51) Int. Cl.
*G01C 21/20* (2006.01)
*G01C 21/34* (2006.01)
(Continued)

(52) U.S. Cl.
CPC .......... *G01C 21/206* (2013.01); *G01C 21/34* (2013.01); *H04W 4/025* (2013.01); *H04W 4/33* (2018.02)

(58) Field of Classification Search
CPC .... G01C 21/206; G01C 21/34; G01C 22/006; H04W 4/024; H04W 4/025; H04W 4/33
See application file for complete search history.

(56) References Cited

U.S. PATENT DOCUMENTS

| 8,145,703 B2 * | 3/2012 | Frishert | G06F 16/9537 709/203 |
| 8,423,290 B1 * | 4/2013 | Walsh | G01C 21/20 701/423 |

(Continued)

*Primary Examiner* — Babar Sarwar

(57) ABSTRACT

A system described herein may generate visual representations of physical locations, such as floors of office buildings, outdoor areas, or other types of places. The visual representations may be based on a node map, which may be generated based on data received from user devices and/or by owners or proprietors of business or other types of locations. The node map, for a given place, may indicate features of the place, such as architectural features (e.g., doors, walls, or rooms), visible features (e.g., wall hangings, signs, or other landmarks), Radio Frequency ("RF") footprint features, or other features. The node map may indicate the likelihood of a given user device moving from one node to another node, and these likelihoods may be used to generate navigation instructions.

20 Claims, 11 Drawing Sheets

(51) Int. Cl.
*H04W 4/02* (2018.01)
*H04W 4/33* (2018.01)

(56) References Cited

U.S. PATENT DOCUMENTS

| | | | | | |
|---|---|---|---|---|---|
| 8,489,641 | B1* | 7/2013 | Seefeld | | G06F 16/248 707/792 |
| 8,538,374 | B1* | 9/2013 | Haimo | | G01S 5/0027 455/404.2 |
| 8,725,597 | B2* | 5/2014 | Mauseth | | G06Q 30/0201 705/28 |
| 8,745,516 | B2* | 6/2014 | Mason | | G09B 29/007 715/767 |
| 8,897,817 | B1* | 11/2014 | Jackson | | G01S 19/39 455/457 |
| 8,989,778 | B2* | 3/2015 | Altman | | H04W 4/02 455/456.3 |
| 9,021,384 | B1* | 4/2015 | Beard | | G06F 3/0481 715/781 |
| 10,178,507 | B1* | 1/2019 | Roberts | | H04W 4/026 |
| 10,270,727 | B2* | 4/2019 | Philipson | | G06F 3/0488 |
| 10,270,899 | B1* | 4/2019 | Merjanian | | G08B 25/12 |
| 2007/0296575 | A1* | 12/2007 | Eisold | | G08B 27/008 340/539.16 |
| 2008/0070546 | A1* | 3/2008 | Lee | | H04L 12/1845 455/404.2 |
| 2008/0070593 | A1* | 3/2008 | Altman | | H04L 63/102 455/457 |
| 2009/0006336 | A1* | 1/2009 | Forstall | | G06Q 30/00 |
| 2009/0047972 | A1* | 2/2009 | Neeraj | | G06Q 10/10 455/456.1 |
| 2009/0177374 | A1* | 7/2009 | Liu | | G01C 21/3694 701/532 |
| 2010/0077484 | A1* | 3/2010 | Paretti | | G06F 21/6245 726/26 |
| 2010/0145947 | A1* | 6/2010 | Kolman | | H04W 4/02 707/736 |
| 2010/0234046 | A1* | 9/2010 | Wood | | H04W 4/029 455/456.3 |
| 2011/0270705 | A1* | 11/2011 | Parker | | G06F 16/29 705/26.61 |
| 2012/0008526 | A1* | 1/2012 | Borghei | | H04W 4/022 370/254 |
| 2012/0102409 | A1* | 4/2012 | Fan | | G06F 3/0481 715/738 |
| 2012/0221239 | A1* | 8/2012 | Cooper | | H04M 1/72552 701/409 |
| 2013/0325340 | A1* | 12/2013 | Forstall | | G01C 21/362 701/533 |
| 2013/0326366 | A1* | 12/2013 | Choi | | H04W 4/12 715/752 |
| 2013/0345980 | A1* | 12/2013 | van Os | | G06F 3/0488 701/538 |
| 2014/0221016 | A1* | 8/2014 | Lee | | G08B 21/0272 455/456.3 |
| 2015/0111523 | A1* | 4/2015 | South | | G08B 25/016 455/404.2 |
| 2015/0163626 | A1* | 6/2015 | Zimmer | | H04W 4/02 455/404.2 |
| 2015/0304848 | A1* | 10/2015 | Kim | | H04W 12/08 455/411 |
| 2015/0317809 | A1* | 11/2015 | Chellappan | | G01C 21/362 455/404.1 |
| 2015/0379441 | A1* | 12/2015 | Syed | | G16H 40/40 705/2 |
| 2016/0249170 | A1* | 8/2016 | Freeland | | H04W 4/026 |
| 2016/0344801 | A1* | 11/2016 | Akkarawittayapoom | | H04L 67/306 |
| 2017/0004595 | A1* | 1/2017 | Bruchal | | G06Q 50/265 |
| 2017/0345285 | A1* | 11/2017 | Merjanian | | G08B 25/12 |
| 2018/0176166 | A1* | 6/2018 | Philipson | | H04L 51/20 |
| 2018/0375678 | A1* | 12/2018 | Lapsley | | G05B 15/02 |
| 2018/0376570 | A1* | 12/2018 | Verbrugh | | G01C 21/206 |

* cited by examiner

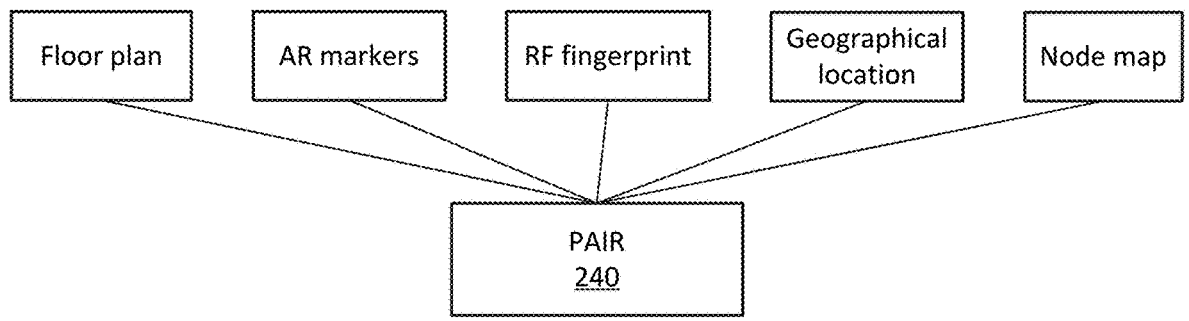
FIG. 4
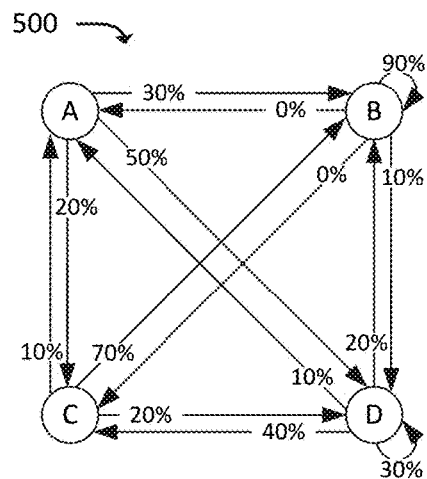
FIG. 5A
|   | TO |   |   |   |
|---|---|---|---|---|
|   | A | B | C | D |
| FROM A | 0% | 30% | 20% | 50% |
| B | 0% | 90% | 0% | 10% |
| C | 10% | 70% | 0% | 20% |
| D | 10% | 20% | 20% | 30% |
FIG. 5B
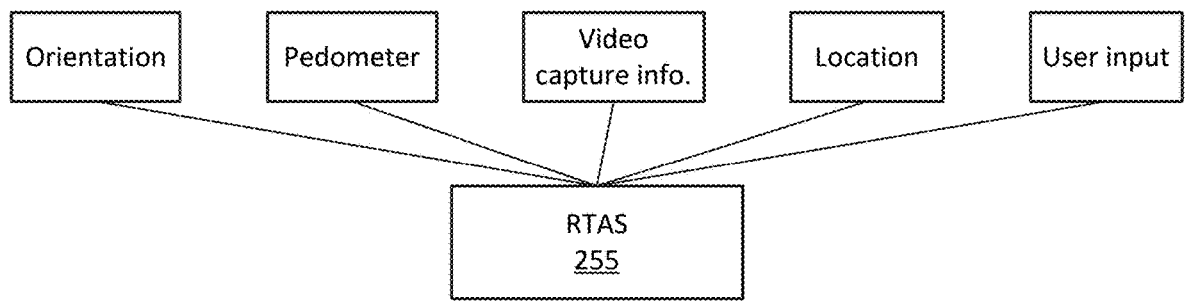
FIG. 6

US 10,982,960 B2

SYSTEMS AND METHODS FOR REAL-TIME UPDATING OF ATTRIBUTES OF AN AREA AND STATUS OF DEVICES WITHIN THE AREA

CROSS-REFERENCE TO RELATED APPLICATION

This Application is a Continuation of co-pending U.S. patent application Ser. No. 16/129,471, titled "SYSTEMS AND METHODS FOR REAL-TIME UPDATING OF ATTRIBUTES OF AN AREA AND STATUS OF DEVICES WITHIN THE AREA," filed Sep. 12, 2018, the contents of which are hereby incorporated by reference.

BACKGROUND

Entities, such as corporations, schools, and institutions may have physical facilities, such as offices, stores, or other buildings. These facilities may be large, confusing, and/or otherwise difficult to navigate. Additionally, individuals (e.g., staff, customers, etc.) may be present within the facilities at different locations in different circumstances. For example, an employee may be seated in a conference room one morning, and at a cubicle on a different floor in the afternoon. While it would technically be possible for such an employee to manually update his/her status (e.g., by using a sign-in sheet, notifying a supervisor of his/her location, etc.), this technique is prone to errors, such as the employee forgetting to update his/her location.

BRIEF DESCRIPTION OF THE DRAWINGS

FIG. 4 illustrates example data that may be used by a Place Attribute Information Repository ("PAIR") in some embodiments;

FIGS. 5A and 5B illustrate example arrangements of a node map, which may be stored by the PAIR of some embodiments;

FIG. 6 illustrates example data that may be used by a Real-Time Assistance System ("RTAS") in some embodiments;

DETAILED DESCRIPTION OF THE PREFERRED EMBODIMENTS

The following detailed description refers to the accompanying drawings. The same reference numbers in different drawings may identify the same or similar elements.

Some embodiments, described herein, may generate a representation (e.g., a graphical representation, a logical representation, or some other type of representation) of one or more places. As discussed herein, the term "place" refers to a given physical area, such as a room, a portion of a floor of a building, an entire floor of a building, multiple rooms or floors of one or more buildings, or the like. In some embodiments, a place may include physical boundaries, such as walls, doors, fences, barriers, etc.; while in some embodiments, a place may not include physical boundaries (e.g., may be an arbitrarily defined region either indoors or outdoors).

Figure 1A:
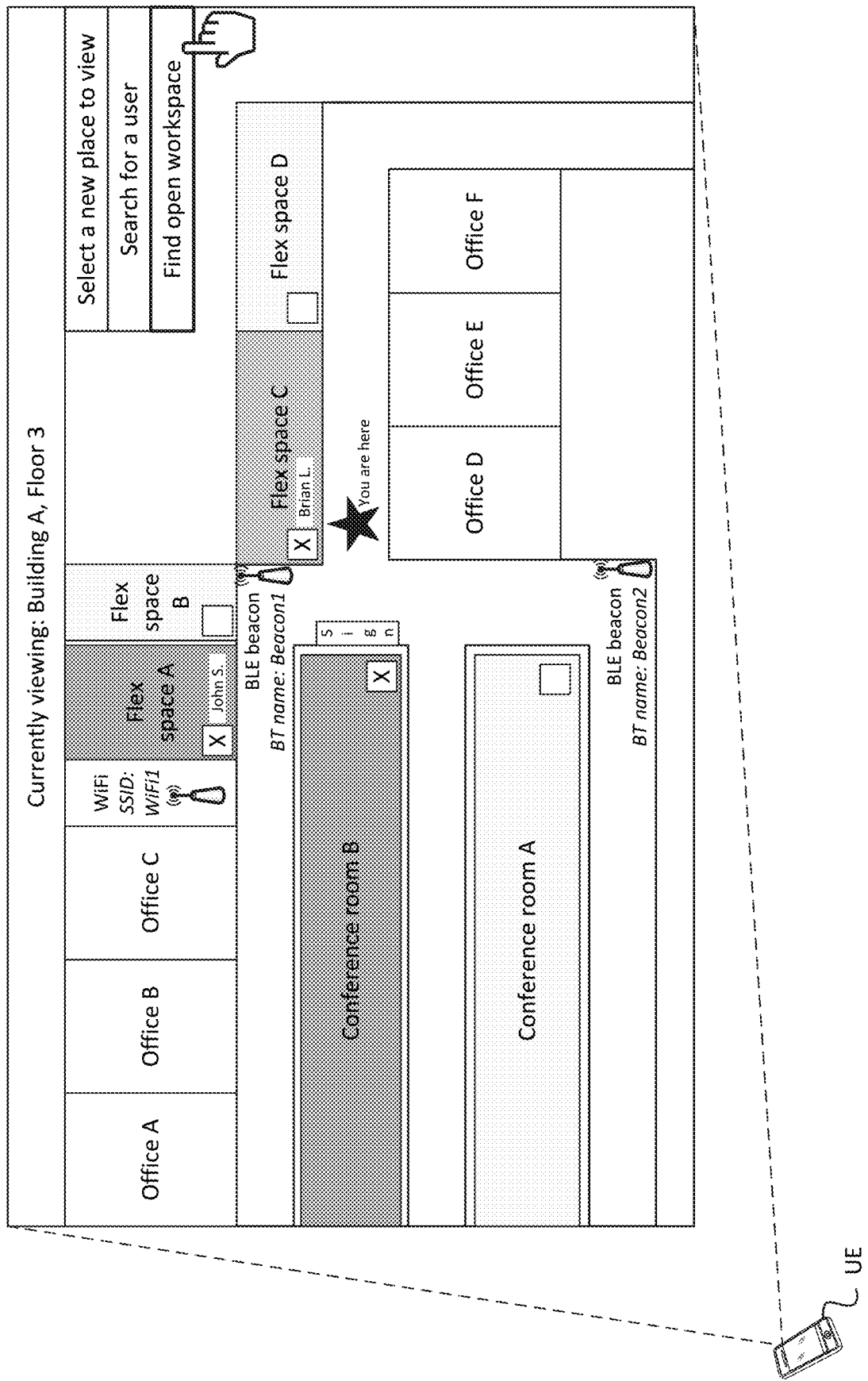
FIGS. 1A-1E illustrate an example overview of one or more embodiments described herein.

The representation of a given place may be presented on a user equipment ("UE"), such as a mobile telephone, of a user who may be interested in the place. For example, as shown in FIG. 1A, a visual representation (e.g., a Graphical User Interface ("GUI") of a floor of a building (i.e., Floor 3 of "Building A," in this example) may be presented on a display screen of a UE. The visual representation may include an overhead "floor plan" view. The visual representation may indicate features of the place, such as layout features of the place (e.g., offices (i.e., Offices A-F, in this example), conference rooms (i.e., Conference Rooms A and B, in this example), and walkways. The visual representation may also indicate visual features of the place (e.g., features that may be visually detected by a user or a device that is physically present in the place), such as a sign hung on a wall. The visual representation of the place may also indicate WiFi networks that are available to join (e.g., by listing the Service Set Identifier ("SSID"), and/or may indicate where network devices (e.g., WiFi access points, routers, Bluetooth Low Energy ("BLE") beacons, etc.) are located. As described below, the visual representation of a place may be generated based on one or more data sources, such as a floor plan of a building, data collected by UEs that are present in the place, and/or other sources.

As further shown, the visual representation may include detailed attributes of some of the features of the place. For example, for conference rooms and flexible work spaces (shown in the figure as "Flex spaces," which may be workspaces that can be dynamically allocated to different individuals at different times), the visual representation may include an indicator that indicates whether the conference room or flex space is available or occupied. For example, as shown, each conference room or flex space may include a box that is either empty or contains an "X" (where an empty box indicates that the room is available, while an "X" denotes that the room is occupied). As another example, each conference room or flex space is illustrated with differing levels of shading, where a darker shade indicates that the room is occupied, and a lighter shade indicates that the room is available. One or more of the rooms may also include a label that shows the occupant(s) of the room. For example, Flex Space A includes a label showing that the occupant is "John S.," while Flex Space C includes a label showing that the occupant is "Brian L." As further shown in the figure, some of the rooms (e.g., offices) may not be shaded (and/or may be shaded differently from rooms that are available or occupied). This lack of shading (or different shading) may denote that these rooms are not available for reserving.

The visual representation may further include an indicator (shown in the figure as a star) that shows a current location of the UE itself. As discussed below, the occupancy status (and/or the location of the UE itself) may be determined based on feedback received from UEs. For instance, location information received from a UE carried by John S. may be used to determine that Flex Space A is occupied by John S.

Figure 1B:
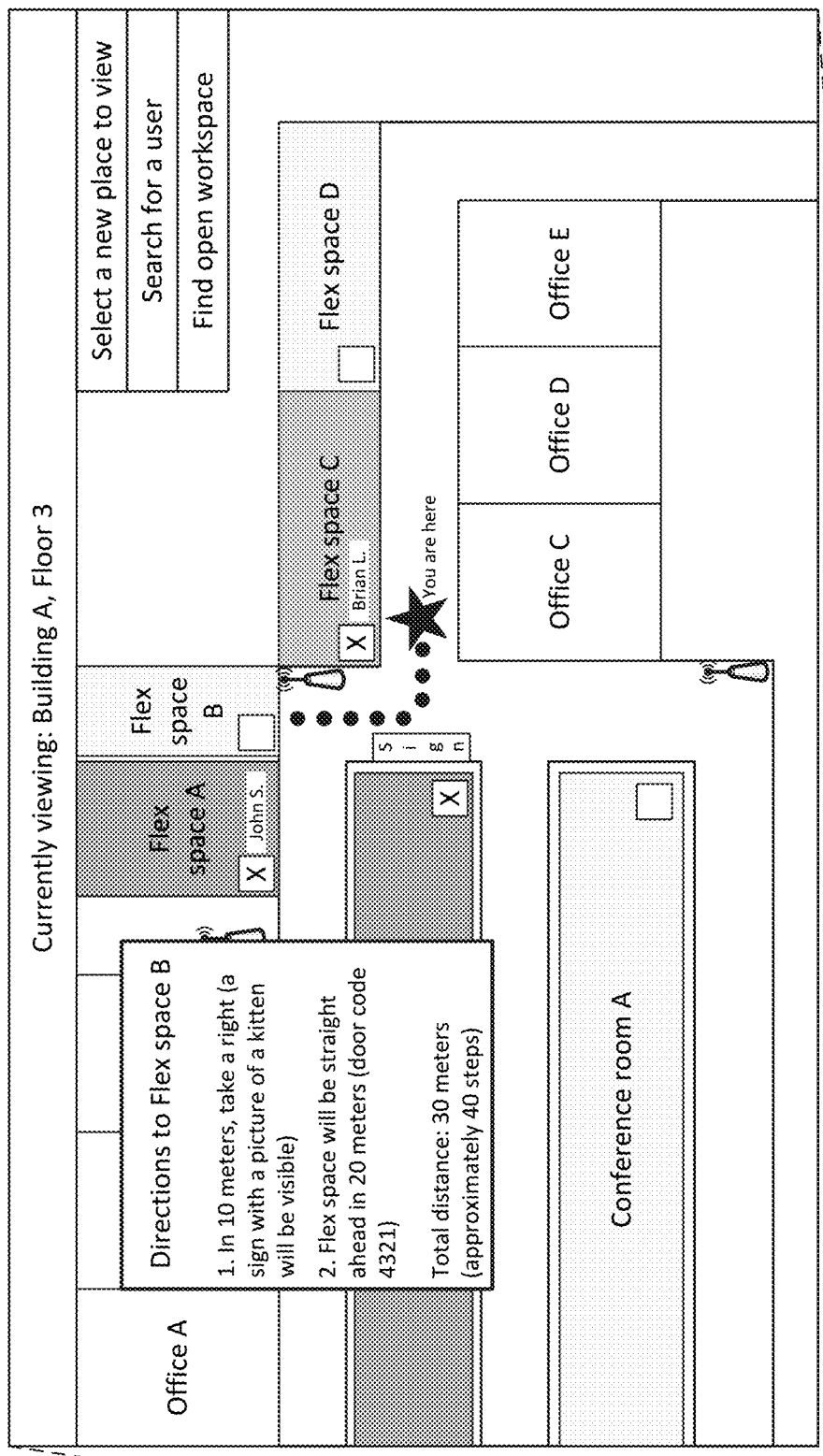

The GUI shown in FIG. 1A may also include selectable options (e.g., buttons), such as "Select a new place to view," "Search for a user," and "Find open workspace." As shown, a user of the UE may select the option to find an open workspace. Based on this selection, and as shown in FIG. 1B, a workspace (e.g., the nearest workspace to the UE's current location, such as Flex Space B in this example) navigation instructions may be generated and provided to the UE. The navigation instructions may include, for instance, an overlay on the visual representation (shown in the figure as a series of dots). The navigation instructions may additionally, or alternatively, include a list of directions from the UE's current location to the determined workspace. The direction may include annotations that may assist the user of the UE in navigating. For example, the navigation instructions may indicate that a picture of a kitten will be visible from where the user should make a right turn. The navigation instructions may also indicate other useful instructions, such as a door code needed to enter the workspace. In some embodiments, the navigation instructions (or another part of the GUI) may include sensor readings and/or other types of real-time data (e.g., as received from one or more Internet of Things ("IoT") devices or other types of suitable devices). The navigation instructions may also indicate an estimated number of steps to complete the navigation route. The number of steps may be estimated based on, for example, steps taken by other individuals (e.g., in the past) to complete the same route or portions of the same route.

Figure 1C:
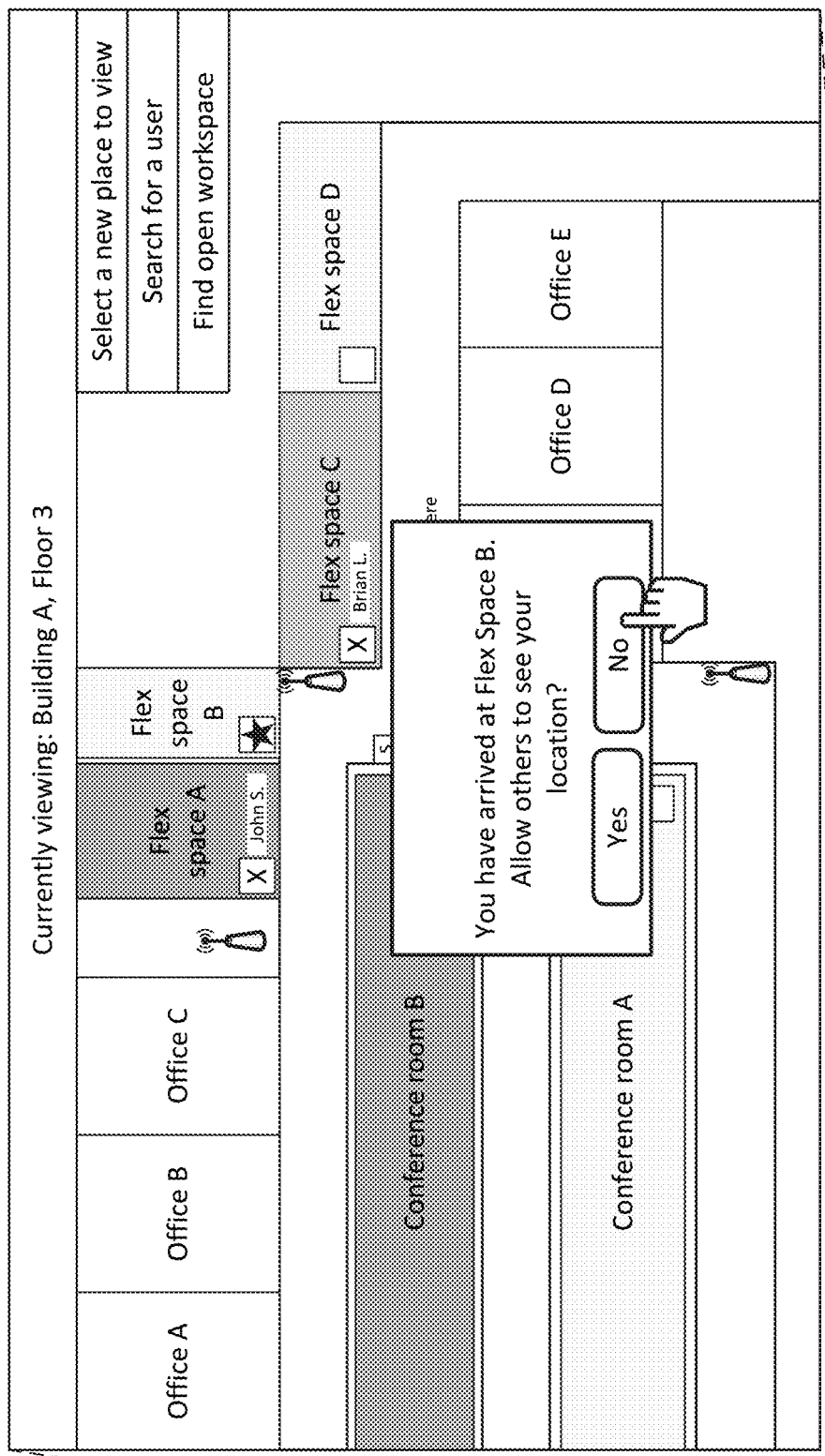
Figure 1D:
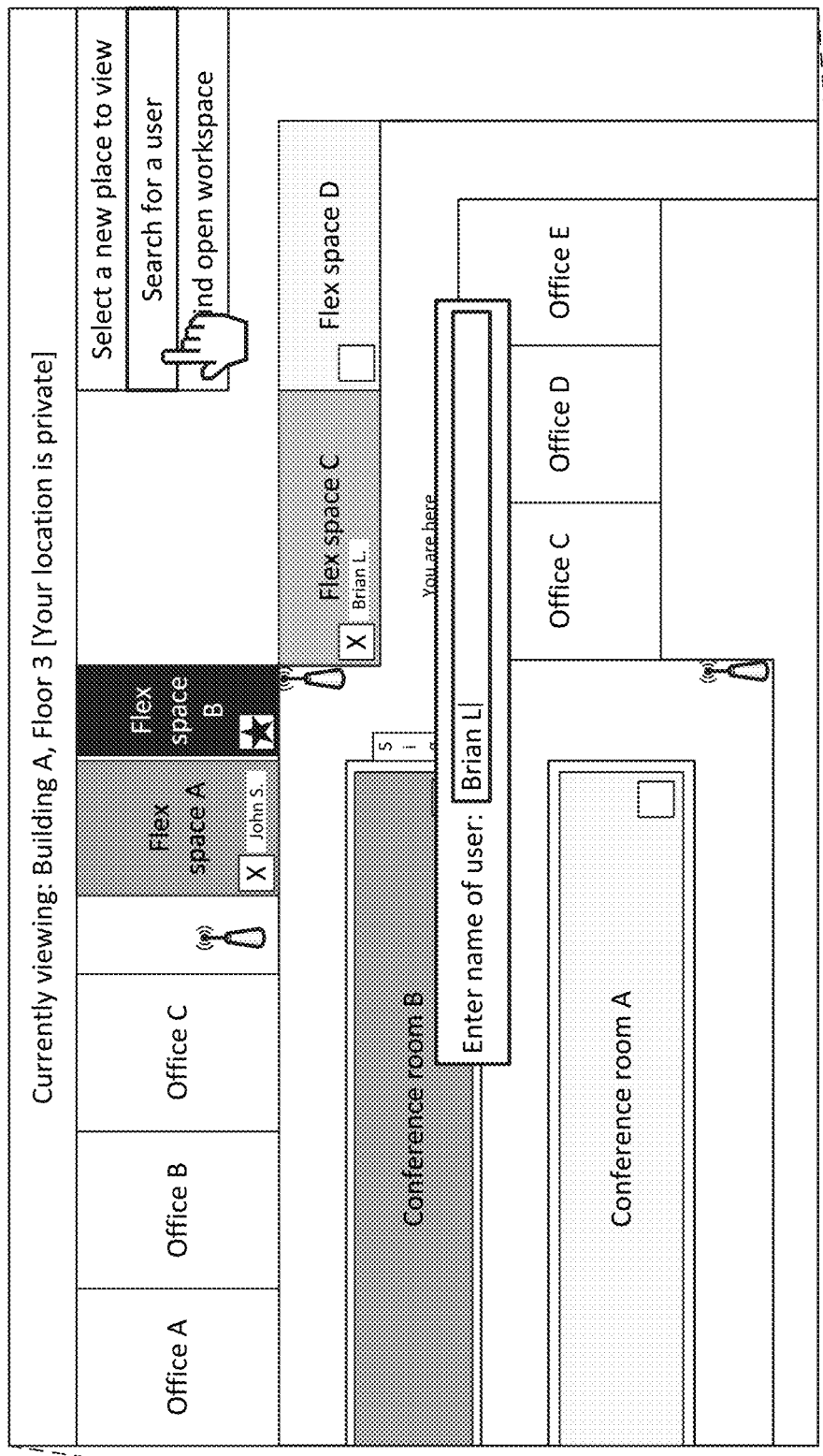

As shown in FIG. 1C, once the UE arrives at the determined workspace, the GUI may prevent an option to display the user's location. In this example, assume that the user selects "No." As shown in FIG. 1D, the user may be notified that his/her location is private (e.g., "[Your location is private]" in the title bar of the GUI). The GUI may also shade the room in which the UE is located differently from the other rooms. For example, in the figure, Flex Space B may be shaded more darkly than the occupied rooms.

Figure 1E:
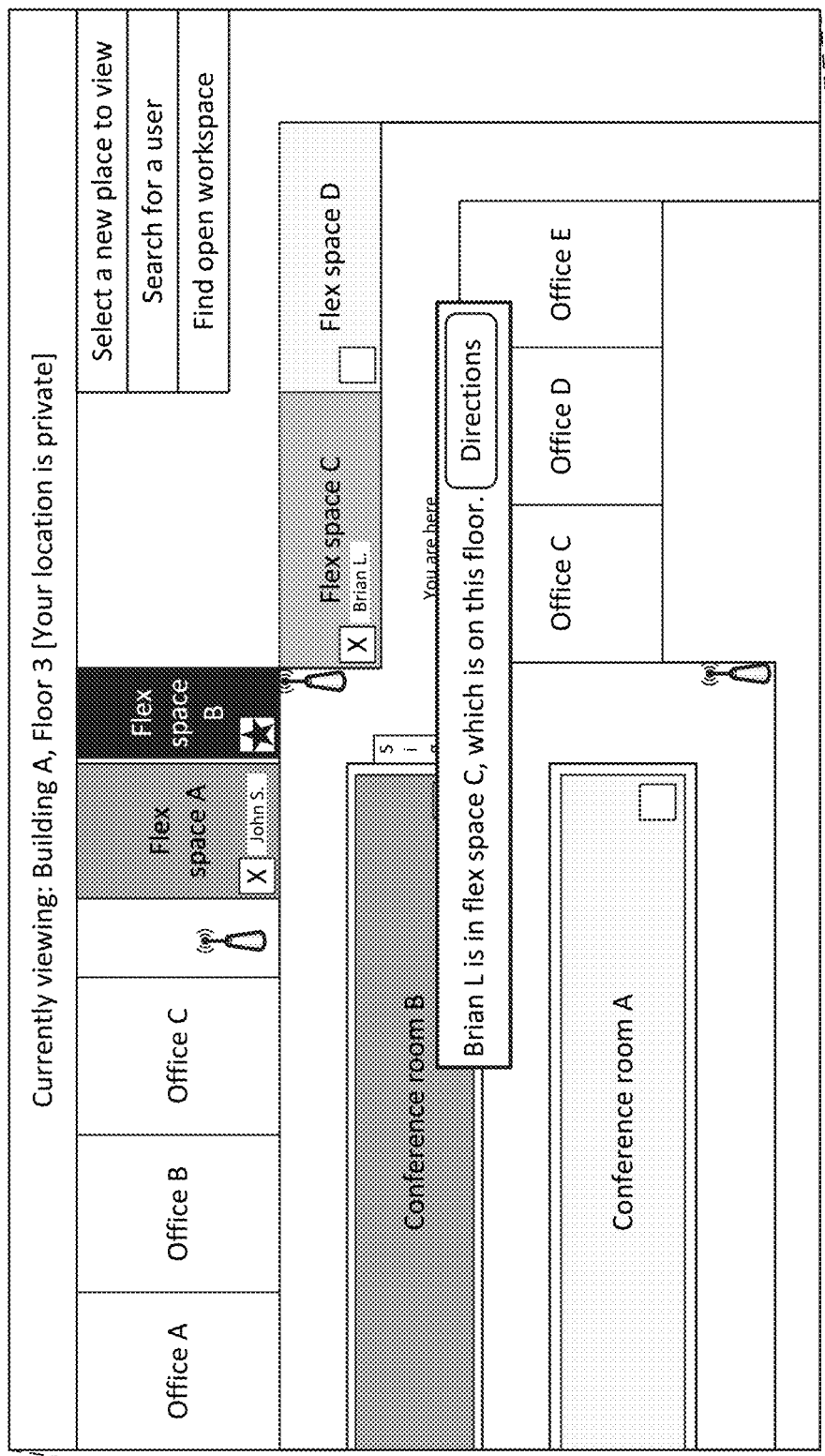

In FIG. 1D, the user may select the "Search for a user" option. Based on this selection, the user may be given an opportunity to enter a name of a user that he/she wishes to locate. In this example, the name "Brian L" has been entered (e.g., via typing, voice input, or some other suitable technique). As shown in FIG. 1E, the user "Brian L." may have been located, and the GUI may indicate that Brian L. is on the same floor as the UE. In some embodiments, more specific information may be provided (e.g., which room in which Brian L. is located). An option may further be presented to provide directions to the room in which Brian L. is located, the selection of which may cause navigation instructions (e.g., similar to those shown in FIG. 1B) to be presented.

Building and presenting a representation of a place, in accordance with embodiments described herein, may allow individuals to clearly determine their whereabouts, as well as features of the place in which they may be interested. As discussed herein, the information about the place may be updated (e.g., if a new sign is installed, if a room is renovated, etc.), which may avoid confusion that might be caused by the visual representation being different from the actual place. Maintaining up-to-date information about devices or users within the place may allow users to make informed decisions about what they would like to do or where they would like to go in the place (e.g., walk to an available workspace and avoid walking to an occupied workspace). The up-to-date information may also be used to assist future users. For example, while a given path may be the shortest between two given points, some embodiments may recognize that users take a different path, and that path may be suggested instead of the shortest path.

Figure 2:
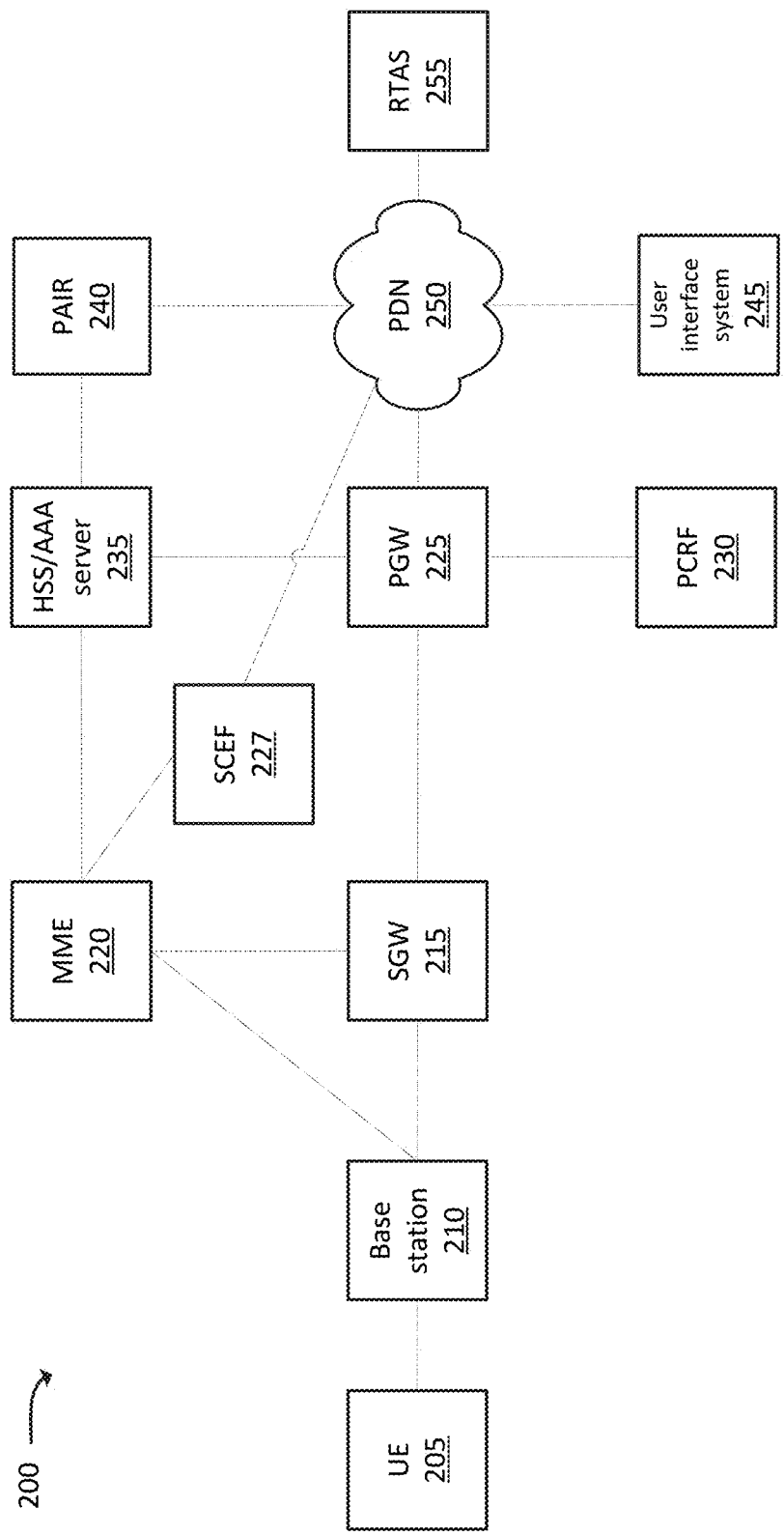
FIGS. 2 and 3 illustrate example environments in which one or more embodiments, described herein, may be implemented.

FIG. 2 illustrates example environment 200, in which systems and/or methods described herein may be implemented. As shown in FIG. 2, environment 200 may include UE 205, base station 210, Serving Gateway ("SGW") 215, Mobility Management Entity ("MME") 220, PDN gateway ("PGW") 225, Service Capability Exposure Function ("SCEF") 227, policy and charging rules function ("PCRF") 230, home subscriber server ("HSS")/authentication, authorization, accounting ("AAA") server 235 (hereinafter referred to as "HSS/AAA server 235"), Place Attribute Information Repository ("PAIR") 240, user interface system 245, PDN 250, and Real-Time Assistance System ("RTAS") 255.

While "direct" connections are shown in FIG. 2 between certain devices, some devices may communicate with each other via one or more intermediary devices (e.g., routers, switch, hubs, etc.) or networks (e.g., an Ethernet backhaul network ("EBH") and/or some other type of network). Furthermore, some of the connections shown in FIG. 2 may be logical connections, and may represent the communication between different logical portions of a single device. Further, in some implementations, some devices, shown in FIG. 2, may communicate with each other even though connections are not shown between such devices in the figure.

Environment 200 may include an evolved packet system ("EPS") that includes a Third Generation Partnership Project ("3GPP") radio access network ("RAN") and/or an Evolved Packet Core ("EPC") network that is operated based on a 3GPP wireless communication standard. The RAN may be, or may include, a Long-Term Evolution ("LTE") network, a fifth generation ("5G") RAN, etc., that each include one or base stations 210 (which may take the form of evolved NodeBs ("eNBs")), via which UE 205 may communicate with the EPC network. The EPC network may include one or more SGWs 215, PGWs 225, SCEFs 227, and/or MMEs 220, and may enable UE 205 to communicate with PDN 250 and/or an Internet protocol ("IP") multimedia subsystem ("IMS") core network (not shown). The IMS core network may include and/or communicate with HSS/AAA server 235, and may manage authentication, session initiation, account information, a user profile, etc., associated with UE 205.

UE 205 may include a computation and communication device, such as a wireless mobile communication device that is capable of communicating with base station 210 and/or PDN 250. UE 205 may be, or may include, a radiotelephone; a personal communications system ("PCS") terminal (e.g., a device that combines a cellular radiotelephone with data processing and data communications capabilities); a personal digital assistant ("PDA") (e.g., a device that may include a radiotelephone, a pager, Internet/intranet access, etc.); a smart phone; a laptop computer; a tablet computer; a camera; a personal gaming system; an IoT device (e.g., a sensor, a smart home appliance, or the like); a Mobile to Mobile ("M2M") device; or another type of mobile computation and communication device. UE 205 may send traffic to and/or receive traffic from PDN 250 via base station 210, SGW 215, PGW 225, and/or SCEF 227.

Base station 210 may each include one or more network devices that receive, process, and/or transmit traffic, such as calls, audio, video, text, and/or other data, destined for and/or received from UE 205. In one example, base station 210 may be part of an LTE network, a 5G network, another advanced network, etc. Base station 210 may receive traffic, destined for UE 205, from SGW 215, PGW 225, SCEF 227, and/or PDN 250, and may output the traffic to UE 205. Base station 210 may also receive traffic from UE 205, and may output the traffic to its intended destination via SGW 215, PGW 225, SCEF 227, and/or PDN 250.

SGW 215 may include one or more network devices that gather, process, search, store, and/or provide information in a manner described herein. SGW 215 may, for example, aggregate traffic received from one or more base stations 210, and may send the aggregated traffic to PDN 250 via PGW 225.

MME 220 may include one or more computation and communication devices that perform operations to register UE 205 with the EPS, to establish bearer channels associated with a session with UE 205, to hand off UE 205 from the EPS to another network, to hand off UE 205 from the other network to the EPS, and/or to perform other operations. MME 220 may perform policing operations on traffic destined for and/or received from UE 205. MME 220 may, in some embodiments, receive messages via control plane signaling, which are destined to and/or sent from UE 205. In some embodiments, MME 220 may control plane signaling for UE 205 from SCEF 227, and/or may forward control plane signaling from UE 205 to PDN 250 via SCEF 227.

PGW 225 may include one or more network devices that gather, process, search, store, and/or provide information in a manner described herein. PGW 225 may aggregate traffic received from one or more SGWs 215, etc. and may send the aggregated traffic to PDN 250. PGW 225 may also, or alternatively, receive traffic from PDN 250 and may send the traffic toward UE 205 via base station 210 and/or SGW 215.

SCEF 227 may include one or more network devices that gather, process, search, store, and/or provide information in a manner described herein. SCEF 227 may aggregate traffic received from PDN 250 (and/or one or more other devices and/or systems) and may send the aggregated traffic to UE 205 (e.g., via MME 220). SCEF 227 may also, or alternatively, receive traffic from UE 205 (e.g., via MME 220) and may send the traffic toward PDN 250.

PCRF 230 may include one or more devices that aggregate information to and from the EPC network and/or other sources. PCRF 230 may receive information regarding policies and/or subscriptions from one or more sources, such as subscriber databases and/or from one or more users (such as, for example, an administrator associated with PCRF 230).

HSS/AAA server 235 may include one or more devices that manage, update, and/or store, in a memory associated with HSS/AAA server 235, profile information associated with a subscriber. HSS/AAA server 235 may perform authentication, authorization, and/or accounting operations associated with the subscriber and/or a communication session with UE 205.

PAIR 240 may include one or more devices that perform functionality described herein. For example, PAIR 240 may generate a node map based on information received from HSS/AAA server 235, UE 205, and/or one or more other information sources. As described below, the node map may be used in order to generate visual representations of places, and/or navigation instructions within places. In some embodiments, PAIR 240 may communicate with one or more other devices or systems (e.g., HSS/AAA server 235, user interface system 245, and/or RTAS 255) via PDN 250 and/or via another type of interface. For example, in some embodiments, PAIR 240 may include a proprietary and/or dedicated communication pathway between PAIR 240 and HSS/AAA server 235 (e.g., a communication pathway that does not include PDN 250, and/or does not include the Internet).

User interface system 245 may include one or more devices that perform functionality described herein. For example, user interface system 245 may communicate with UE 205 to present information (e.g., graphical information that is derived from information stored and/or provided by PAIR 240) about one or more places. User interface system 245 may, in some embodiments, process feedback from UE 205 (e.g., requests for information, feedback regarding navigation instructions, etc.), and may notify PAIR 240 and/or RTAS 255 regarding the feedback. As described below, node maps and/or other information associated with places may be modified based on the feedback.

RTAS 255 may include one or more devices that perform functionality described herein. For example, RTAS 255 may receive and/or otherwise determine information associated with UE 205 (e.g., location information, orientation information, or the like). In some embodiments, the information may be received while UE 205 is interacting with user interface system 245 and/or PAIR 240 (e.g., is in the process of receiving or presenting navigation instructions, etc.). In some embodiments, RTAS 255 may communicate with UE 205 to receive the information regarding UE 205. In some embodiments, RTAS 255 may communicate with one or more other devices or systems (e.g., MME 220, HSS/AAA server 235, etc.) in order to determine information associated with UE 205 (e.g., user profile information of a user associated with UE 205, network-determined location of UE 205, etc.).

PDN 250 may include one or more wired and/or wireless networks. For example, PDN 250 may include an IP-based PDN, a wide area network ("WAN") such as the Internet, a private enterprise network, and/or one or more other networks. UE 205 may connect, through PGW 225, to data servers, application servers, other UEs 205, and/or to other servers or applications that are coupled to PDN 250. PDN 250 may be connected to one or more other networks, such as a public switched telephone network ("PSTN"), a public land mobile network ("PLMN"), and/or another network. PDN 250 may be connected to one or more devices, such as content providers, applications, web servers, and/or other devices, with which UE 205 may communicate.

Figure 3:
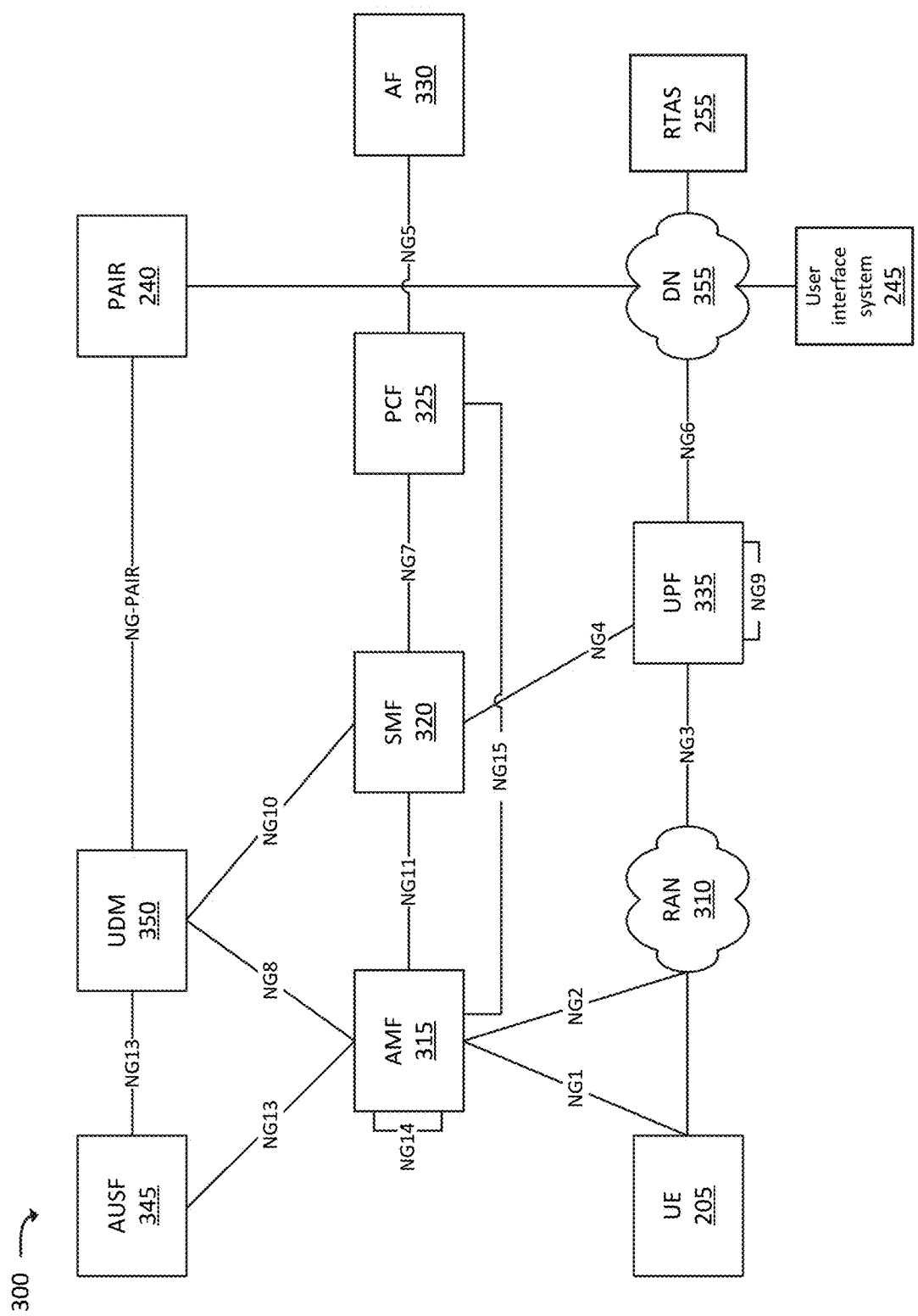

FIG. 3 illustrates another example environment 300, in which one or more embodiments may be implemented. Generally speaking, similar operations may be performed in environment 200 as in environment 300, in order to handle user input in accordance with embodiments described herein. Environment 300 may correspond to a 5G network, and/or may include elements of a 5G network.

As shown in FIG. 3, environment 300 may include UE 205, RAN 310, AMF 315, Session Management Function ("SMF") 320, Policy Control Function ("PCF") 325, Application Function ("AF") 330, User Plane Function ("UPF") 335, Data Network ("DN") 355, Authentication Server Function ("AUSF") 345, Unified Data Management ("UDM") 350, PAIR 240, user interface system 245, and/or RTAS 255.

The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more functions described as being performed by another one or more of the devices of environments 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300.

RAN 310 may be, or may include, a 5G RAN that includes one or more base stations, via which UE 205 may communicate with one or more other elements of environment 300. UE 205 may communicate with RAN 310 via an air interface. For instance, RAN 310 may receive traffic (e.g., voice call traffic, data traffic, messaging traffic, signaling traffic, etc.) from UE 305 via the air interface, and may communicate the traffic to UPF 335, and/or one or more other devices or networks. Similarly, RAN 310 may receive traffic intended for UE 305 (e.g., from UPF 335, and/or one or more other devices or networks) and may communicate the traffic to UE 305 via the air interface.

AMF 315 may include one or more computation and communication devices that perform operations to register UE 305 with the 5G network, to establish bearer channels associated with a session with UE 305, to hand off UE 305 from the 5G network to another network, to hand off UE 305 from the other network to the 5G network, and/or to perform other operations. In some embodiments, the 5G network may include multiple AMFs 315, which communicate with each other via the NG14 interface (denoted in FIG. 3 by the line marked "NG14" originating and terminating at AMF 315).

SMF 320 may include one or more network devices that gather, process, store, and/or provide information in a manner described herein. SMF 320 may, for example, facilitate in the establishment of communication sessions on behalf of UE 305. In some embodiments, the establishment of communications sessions may be performed in accordance with one or more policies provided by PCF 325.

PCF 325 may include one or more devices that aggregate information to and from the 5G network and/or other sources. PCF 325 may receive information regarding policies and/or subscriptions from one or more sources, such as subscriber databases and/or from one or more users (such as, for example, an administrator associated with PCF 325).

AF 330 may include one or more devices that receive, store, and/or provide information that may be used in determining parameters (e.g., quality of service parameters, charging parameters, or the like) for certain applications.

UPF 335 may include one or more devices that receive, store, and/or provide data (e.g., user plane data). For example, UPF 335 may receive user plane data (e.g., voice call traffic, data traffic, etc.), destined for UE 205, from DN 355, and may forward the user plane data toward UE 205 (e.g., via RAN 310, SMF 320, and/or one or more other devices). In some embodiments, multiple UPFs 335 may be deployed (e.g., in different geographical locations), and the delivery of content to UE 305 may be coordinated via the NG9 interface (e.g., as denoted in FIG. 3 by the line marked "NG9" originating and terminating at UPF 335). Similarly, UPF 335 may receive traffic from UE 205 (e.g., via RAN 310, SMF 320, and/or one or more other devices), and may forward the traffic toward DN 355. In some embodiments, UPF 335 may communicate (e.g., via the NG4 interface) with SMF 320, regarding user plane data processed by UPF 335. As mentioned above, this information may aid SMF 320 in monitoring (e.g., tracking, counting, etc.) the traffic for particular subscribers.

DN 355 may include one or more wired and/or wireless networks. For example, DN 355 may include an IP-based PDN, a WAN such as the Internet, a private enterprise network, and/or one or more other networks. UE 205 may communicate, through DN 355, with data servers, application servers 255, other UEs 205, and/or to other servers or applications that are coupled to DN 355. DN 355 may be connected to one or more other networks, such as a public switched telephone network ("PSTN"), a PLMN, and/or another network. DN 355 may be connected to one or more devices, such as content providers, applications, web servers, and/or other devices, with which UE 205 may communicate.

AUSF 345 and UDM 350 may include one or more devices that manage, update, and/or store, in one or more memory devices associated with AUSF 345 and/or UDM 350, profile information associated with a subscriber. AUSF 345 and/or UDM 350 may perform authentication, authorization, and/or accounting operations associated with the subscriber and/or a communication session with UE 305.

As similarly described above with respect to environment 200, PAIR 240 may, in some embodiments, be an internal component with respect to one or more other devices and/or systems discussed with regard to environment 300. For example, PAIR 240 may have a dedicated interface (shown as "NG-PAIR") between PAIR 240 and UDM 350, so that PAIR 240 can communicate with UDM 350 without traversing the Internet or DN 355.

FIG. 4 illustrates example data sources that can be used by PAIR 240, in accordance with some embodiments. For example, PAIR 240 may use a floor plan, augmented reality ("AR") markers, radio frequency ("RF") fingerprint information, geographical location information, and/or a node map. The floor plan may be, for example, a schematic or other type of information that defines a layout and/or physical attributes of a place. For example, the floor plan may indicate where physical features, such as walls, doors, rooms, sculptures, fixtures, parking spaces, stairs, columns, or other physical objects/features are located. The floor plan may be received from, for example, an owner or operator of a given place (e.g., an owner or operator of a building, parking lot, outdoor venue, etc.). The floor plan may include a diagram or picture, and/or may include a data structure that denotes (e.g., using a coordinate system) where objects and/or features are located. In some embodiments, the floor plan may be a two-dimensional (e.g., overhead) representation of a place. In some embodiments, the floor plan may be a three-dimensional (e.g., orthogonal) representation of a place.

The AR marker information may include features that may be visible to users in a given place. For example, AR marker information may indicate signs, posters, or other wall hangings. The AR information may include information that is similar to, or corroborates, floor plan information. For example, the floor plan information may indicate that a door is located at a certain point in a room, and the AR information may include a picture of the door, as well as an indication of where in the room the door is located. In this sense, some of the AR marker information may supplement some of the floor plan information. The AR information may, in some embodiments, include any visible feature that may be detected by, for example, a camera of a mobile telephone, a security camera, and/or some other camera. In some embodiments, the AR information may be received or generated as part of a dedicated scanning process (e.g., an owner or operator of PAIR 240, and/or some other individual) may purposely "sweep" a place with a camera, in order to collect images of some or all of the place. Additionally, or alternatively, as users are present in the place, they may hold devices (e.g., mobile telephones, tablets, etc.) in such a manner that the devices are able to use a camera (e.g., a rear-facing camera and/or a front-facing camera) to capture images of the place. This image collection may be performed based on express consent granted by the user (e.g., an "opt-in"), and collected images may be subject to review by the user and further subject to immediate deletion upon the user's request.

Based on the captured images, PAIR 240 may use a suitable image recognition technique to identify distinct objects in place. PAIR 240 may also use contextual information to determine, or estimate, where in the place the detected objects are. For example, PAIR 240 may receive an image of two doors, three feet apart. PAIR 240 may analyze the floor plan and determine that the place includes only one instance of two doors, three feet apart. Based on this analysis, PAIR 240 may identify that the two doors, identified in the image, are located at the determined location in the place. Additionally, or alternatively, PAIR 240 may use location information included in the image itself (e.g., Exchangeable Image File Format ("EXIF") and/or other type of metadata information), and/or location information provided in conjunction with the image (e.g., where the location is determined by UE 205, as discussed below) to determine where the AR markers are located in the place.

The RF fingerprint information may include information that indicates RF signals detected in the place. For example, the RF fingerprint information may indicate types of RF signals detected (e.g., WiFi signals, BLE signals, and/or other types of RF signals) in the place (e.g., by UEs 205 present in the place). The RF fingerprint information may also include supplemental information, such as timestamp information, signal strength information, interference information, etc. The timestamp information may be useful in determining factors that can affect the determination of the source of RF signals. For example, at one time, the received power of WiFi signals from a particular WiFi access point may be relatively weak due to a large quantity of UEs accessing the WiFi access point, while the received power of WiFi signals from the same WiFi access point may be relatively strong at another time when fewer 205 are accessing the WiFi access point. Based on the RF fingerprint information received over time from one or more UEs 205, PAIR 240 may determine or estimate the location of RF-emitting devices. In some embodiments, the RF fingerprint information may include manually-provided information regarding RF-emitting devices, such as the physical location of the RF-emitting devices, SSIDs and/or passwords that can be used to access WiFi access points, names of BLE beacons, etc.

In some embodiments, the RF fingerprint may include geofencing information, and/or information that may be used for geofencing (e.g., in conjunction with floor plan information). For example, the RF fingerprint may indicate locations, RF types (e.g., WiFi, Bluetooth, etc.), hardware/device identifiers, and/or other types of information that can indicate where geofencing devices are located. For instance, each room on a floor may have a geofencing device (e.g., a BLE beacon) placed in a doorway of the room, and the RF information may include information identifying each BLE device (e.g., using a hardware identifier, such as a MAC address and/or an identifier broadcasted by the BLE device) as being associated with a particular room (e.g., using a room number and/or some other type of indicator of location within the place).

The geographical information, used by PAIR 240, may include a geographical region that bounds, defines, or otherwise describes the place. For example, the geographical information may include a set of latitude and longitude coordinates (e.g., four coordinate pairs for a rectangle-shaped place, six coordinate pairs for a hexagonally shaped place, and so on), a physical address (e.g., "221B Baker Street"), a coordinate point and a radius (e.g., a circle where the center is the coordinate point), and/or some other way of representing a physical location. The geographical information may be provided by an owner or operator of PAIR 240 or a given place, and/or may be collected (e.g., subject to express user consent, review, and deletion, as discussed above) by a UE of a user that is present in the place.

The node map may represent attributes or features of the place as nodes. For example, one room may be represented by a first node in the node map, another room may be represented by a second node in the node map, an arbitrary point in the place may be represented by a third node in the node map, a picture hanging on a wall may be represented by a fourth node in the node map, and so on. Generally speaking, the node map may indicate interactions of users between various features or attributes of a place. The nodes in the node map may, in some embodiments, each represent a physical location or a region (e.g., a 1-meter wide circle, a 0.5×0.5-meter square, etc.). The node map may include connections between nodes, which may indicate the likelihood of a user physically moving from one node to another.

A simplified example of a node map 500 is shown in FIG. 5A. As shown, node map 500 may include nodes A-D. Node map 500 also includes a series of 1-way connections between nodes, represented as unidirectional arrows. These arrows may represent the likelihood of a user moving from one node (e.g., a location represented by a node) to another node (e.g., a location represented by the other node). For example, for a user currently at Node A, the node map may indicate that the user's likelihood of moving Node B is 30%, to Node C is 20%, and to Node D is 50%.

In some embodiments, the information stored in node map 500 (e.g., the identification of the nodes) may be based on an analysis of other types of information received by PAIR 240. For instance, PAIR 240 may analyze a floor plan, and may automatically (e.g., using image recognition techniques, pattern recognition techniques, and/or using some other suitable technique) identify attributes or features that should be associated with a node. For instance, PAIR 240 may be configured to generate a node when a door is detected in the floor plan, and/or when AR information indicates that a door is present. As another example, PAIR 240 may be configured to generate a node when a corner of a walkway is detected (e.g., based on floor plan information and/or AR information). As yet another example, PAIR 240 may be configured to generate a node, and/or otherwise store information, when detecting handicap access features in the place (e.g., a ramp, a handicap sign, an automatic door, a bathroom stall that is larger than surrounding bathroom stalls, or the like). In some embodiments, PAIR 240 may further identify boundaries associated with the nodes, where boundaries can be used to indicate whether a given UE 205 is in, near, at, is in a viewing frustum of, etc., a given attribute or feature of a place. For example, a door may have a relatively small boundary (e.g., within 0.5 meter of the threshold of the door), while a wall hanging may have a relatively large boundary (e.g., a bounded region that represents areas from where the wall hanging is visible). In some embodiments, the boundaries of one or more nodes may be manually specified or modified.

The information stored in node map 500 (e.g., the likelihood of movement from one node to another) may be based on information received from UEs 205 (e.g., based on real-time feedback from UEs 205, such as location information, orientation information video capture information, and/or other information discussed below with respect to FIG. 6—subject to explicit user consent, review, and deletion).

In some embodiments, node map 500 may include a temporal element. For instance, different concurrent versions of node map 500 may indicate likely user movements within different thresholds of time. For instance, one version of node map 500 may indicate likely user movements within 30 seconds of arriving at a given node, while another version of node map 500 may indicate likely user movements within 10 minutes of arriving at a given node.

For instance, as shown, node map 500 shows an arrow from Node B to Node B, and an arrow from Node D to Node D. These arrows may indicate the likelihood that a user will stay at Node B or Node D, respectively, within a given time threshold. Assume, for example, that the time threshold associated with FIG. 5A is 10 minutes. Continuing with the example of FIG. 5A, this means that 90% users who arrived at Node B stayed at Node B for 10 minutes or longer, while 0% of users went from Node B to Nodes A or C within 10 minutes, and 10% of users went from Node B to Node D within 10 minutes. Different versions of node map 500 may be used for different purposes. For example, a relatively short (e.g., 5 seconds) time threshold may be used for users who wish to navigate from one node to another, while a relatively long (e.g., 1 hour) time threshold may be used for users who wish to find a location to stay for a relatively long time (e.g., an office workspace).

In some embodiments, while not shown, node map 500 may include additional information. For example, node map 500 may include information indicating the physical distance between nodes, historical information relating to how long users took to travel from one node to another (e.g., expressed in terms of steps taken and/or time, which may be an average, a median, a minimum, a maximum, and/or some other mathematical or statistical function). In some embodiments, a distinct node map may be generated for each place. In some embodiments, a given place may be associated with multiple node maps.

FIG. 5B illustrates another example representation of node map 500. As shown, node map 500 may be represented as table 550. Table 550, shown here, includes the same information as node map 500. For example, table 550 reflects that the likelihood of a user moving from Node A to Node B is 30%, from Node A to Node C is 20%, and so on.

As discussed above, multiple node maps, or multiple versions of node maps, may be associated with the same place. For example, different node maps may be used for different individual users (e.g., based on the movements and/or other information associated with individual users), or different types of users (e.g., where "types" of user may be delineated by demographics and/or other categories or differentiating characteristics). For instance, one node map may be used for handicapped individuals, while another node map may be used for non-handicapped individuals. The node map for handicapped individuals may, in some scenarios, be different because handicapped individuals may prefer different paths (e.g., paths with ramps and/or other handicap access characteristics).

In some embodiments, a distinct node map may be generated for a given pair of starting and ending nodes. For example, assuming that a user desires to go from a location associated with Node A to a location associated with Node B. A particular node map may reflect a probable path (e.g., a set of nodes) that the user would take from Node A to Node B (e.g., based on previous users' or devices' behavior with respect to traveling from Node A to Node B). As discussed below, node maps may be updated and/or refined on an ongoing basis, in order to enhance users' experiences.

FIG. 6 illustrates example information sources that can be used by RTAS 255 to perform one or more operations described herein. For example, RTAS 255 may receive information from UE 205, such as orientation information, pedometer information, video capture information, location information, user input, and/or other types of information. In some embodiments, RTAS 255 may receive the information from UE 205 while UE 205 is in the process of navigating from one point in a place (e.g., node) to another. In some embodiments, RTAS 255 may receive the information from UE 205 on an ongoing basis (e.g., periodically or intermittently—where the collection and storage of any and all such information is subject to express user consent, review, and deletion, as discussed above). As discussed below, the information, received by RTAS 255 from UE 205, may be generated by UE 205 and/or may be based on information received by UE 205. The various types of information provided by UE 205 may be provided with timestamp information, so that RTAS 255 is able to determine the time(s) that correspond to the various received information.

The orientation information may indicate a direction that UE 205 is facing. The orientation may be expressed in terms of local space (e.g., degrees of rotation on X-, Y-, and Z-axes) and/or in terms of magnetic declination (e.g., degrees from North). In some embodiments, the orientation information may be determined by UE 205 (e.g., using a magnetometer, accelerometer, and/or other device or component that is suitable to determine the orientation of UE 205). In some embodiments, UE 205 may determine the orientation information with the assistance of one or more external devices, such as a wearable device (e.g., "smart" watch, "smart" glasses, "smart" jewelry, etc.).

The pedometer information may indicate a quantity of steps taken by a user of UE 205 (e.g., a user that is carrying UE 205, and/or is otherwise physically holding or attached to UE 205). In some embodiments, the pedometer information may be determined by UE 205 (e.g., using any suitable component or collection of components of UE 205). In some embodiments, the orientation information may be determined by UE 205 with the assistance of, and/or may be received from, one or more other devices (e.g., a wearable "smart" device that counts steps taken and/or otherwise includes pedometer functionality).

The video capture information may include images or video captured by an image capture device (e.g., camera) of UE 205. For example, a user may carry UE 205 in such a manner that a front-facing and/or rear-facing camera is able to capture images and/or video. As another example, UE 205 may be communicatively coupled to a wearable device (e.g., a body camera and/or some other wearable device with video capture functionality) that can capture video. As similarly noted above, the captured video may be subject to express user consent, review, and deletion.

The location information may indicate a location (e.g., a geographical location) of UE 205. The location information may be two-dimensional (e.g., latitude and longitude coordinates, and/or coordinates on a local system (e.g., X- and Y-coordinates with a reference point that is within a given place)) or three-dimensional (e.g., where height is expressed in terms of altitude, elevation above a given reference point, the floor of a building, and/or some other suitable way of expressing height). The location information may be determined by UE 205 (e.g., using a Global Positioning System ("GPS") component and/or using some other suitable technique) and/or may be determined by UE 205 with the assistance of, or may be received from, one or more other devices or systems (e.g., from a wireless telecommunications network that uses triangulation techniques to determine the location of UE 205, a geofencing system, or the like).

The user input information may include information manually provided by a user of UE 205. For example, UE 205 may provide prompts, such as "Rate your navigation experience from 1-5 stars," to which a user may provide feedback. As another example, the user input information may include interactions with UE 205 relating to modifying a route between nodes (e.g., a user may be dissatisfied with a route and may re-input the same destination in hopes of being provided with a different route). As yet another example, the user input information may include information that implies that a user was satisfied with a route (e.g., no further requests for navigation instructions were requested by the user within a threshold time of previous navigation instructions being completed).

As mentioned above, a given UE 205 may be, or may include, an IoT device with one more sensors (e.g., sensors that collect the same, additional, and/or different types of data than the examples given above). For instance, a particular IoT device may include a temperature sensor, an occupancy or motion sensor, a light sensor, a barometric sensor, a humidity sensor, and/or some other type of sensor. The data sensed by an IoT device may also be provided to RTAS 255 and/or PAIR 240, in order to assist with navigation instructions and/or with displaying a visual representation of a place. For instance, if one route (e.g., a pathway between one or more nodes) is hotter than usual (e.g., where an IoT device that includes a temperature sensor has reported a temperature that is above a threshold temperature), navigation instructions that include that route may be modified to either remove that route, provide a notification to a user that the route includes a potentially uncomfortable temperature, and/or some other corrective action in response to detecting the high temperature.

As another example, in addition to (or in lieu of) modifying navigation instructions, the information received from IoT devices may be presented via a GUI (e.g., similar to the example GUI shown in FIGS. 1A-1E). For instance, when a graphical representation of a particular place is presented, information from IoT devices may also be presented. Furthermore, the information from IoT devices may be overlaid at, or near (e.g., within a threshold distance of), a location in the visual representation that corresponds to where the IoT devices are physically located. For example, if a temperature sensor is physically located next do a particular corner in a place, the visual representation of the place may include an overlay of a numerical value, that indicates the measured temperate (e.g., in real-time or near-real-time in the particular corner).

Figure 7:
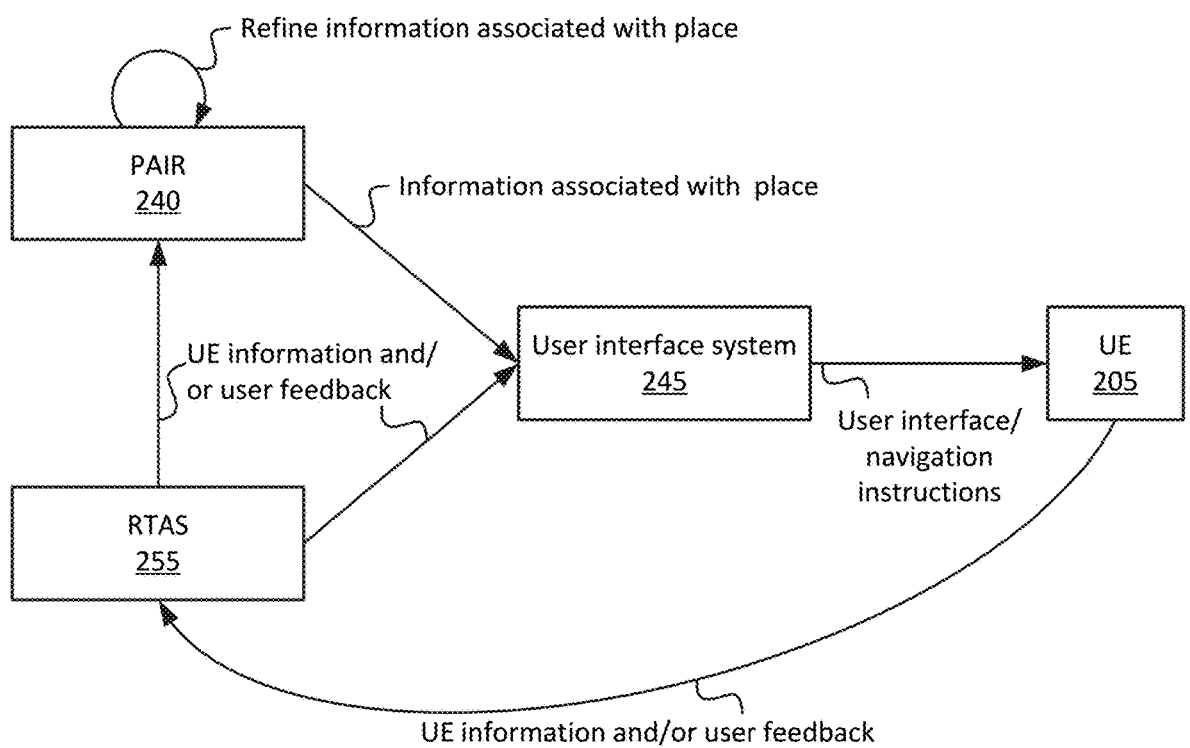
FIG. 7 illustrates example communications between a User Equipment ("UE"), PAIR, RTAS, and user interface system of some embodiments.

FIG. 7 illustrates example interactions between PAIR 240 (discussed above with reference to FIGS. 4-5B) and RTAS 255 (discussed above with reference to FIG. 6) and other devices (i.e., user interface system 245 and UE 205, in this example). One-way arrows are shown in this figure to show examples of which devices may communicate information to which other devices. However, the directionality of these arrows is not meant to suggest that communication could not occur in the opposite direction. For example, one device may request information from another device, but the requests are not illustrated in the figure for the sake of brevity and clarity.

PAIR 240 may, for example, store information regarding one or more places, as discussed above. The information stored by PAIR 240, in some embodiments, may include one or more node maps associated with one or more places. As discussed above, the information stored by PAIR 240 may be based on manually provided information, information received from UEs 205, and/or information from another source.

UE 205 may execute an application that is configured to communicate with, and/or may otherwise (e.g., via by visiting a Uniform Resource Locator ("URL") in a web browser) communicate with, user interface system 245 to obtain information regarding a given place (e.g., a place in which UE 205 is presently located, or a place in which a user of UE 205 is otherwise interested). User interface system 245 may receive the location of UE 205 from UE 205 itself (e.g., when UE 205 requests the information from user interface system 245, UE 205 may include the location of UE 205), from RTAS 255, and/or from some other source. User interface system 245 may identify one or more places that correspond to the request (e.g., a place whose physical location matches, or is within a threshold distance of, the location of UE 205 or a location indicated by a user of UE 205 as being of interest to the user).

Once user interface system 245 has determined the requested place (or places), user interface system 245 may obtain information regarding the place from PAIR 240. For example, user interface system 245 may obtain a node map, a graphical layout of the place, and/or other information from PAIR 240. User interface system 245 may generate a visual representation of the place based on the received information. For example, the received information may include a visual floor plan, as well as information that indicates additional features and the types and locations of the features (e.g., information indicating an office, a door, a statue, a sculpture, a wall hanging, or the like). PAIR 240 may also provide additional information associated with the features (e.g., a door code for a door, a WiFi SSID for a WiFi access point, or the like). In some embodiments, the node map may include the information regarding some or all the features of the place. User interface system 245 may use the visual floor plan in conjunction with the additional information regarding the features of the place to generate the visual representation of the place, for presentation by UE 205 via a GUI.

The GUI may include selectable options similar to those shown in FIGS. 1A-1E. For example, the GUI may include buttons relating to navigation, searching for users, selecting another place to view, etc. Specific features may also include selectable options. For example, referring again to FIG. 1A, the SSID of the WiFi access point (i.e., "WiFi1" in this example) may be displayed when a user of UE 205 selects (e.g., clicks, uses a stylus, touches a touchscreen, etc.) the icon of the WiFi access point. As another example, selecting an available workspace may cause UE 205 to present navigation instructions from the current location of UE 205 to the selected workspace.

The available interactions may be defined by the types of the features (e.g., features that are of the type "WiFi access point" may be associated with a selectable option to display the SSID, features that are of the type "flex space" may be associated with a selectable option to navigate to the flex space, and so on). As discussed above, the type of a feature may be automatically determined by using image recognition, pattern recognition, and/or other techniques. The potential selectable options (e.g., select to view SSID), as well as other associated information (e.g., the SSID itself) may be stored by PAIR 240 as part of the information associated with the place (e.g., may be stored in the node map).

When presented by UE 205, user interface system 245 may process inputs and/or other interactions via the GUI. For example, referring again to FIG. 1A, when the "Find open workspace" button is selected, UE 205 may notify user interface system 245 of the selection. Based on the selection, user interface system 245 may identify a relevant node map. In one example, user interface system 245 may identify one or more attributes associated with UE 205 (e.g., may receive the attributes from UE 205 or from RTAS 255), such as demographics information and/or other differentiating information based on which different node maps have been generated. The one or more attributes may be compared to attributes associated with the node maps (e.g., if UE 205 is associated with a handicapped user, a node map associated with handicapped users may be identified). In some embodiments, user interface system 245 may receive all node maps associated with the place, and may select the relevant node map(s). In some embodiments, PAIR 240 may select the relevant node map(s) (e.g., based on receiving information relevant to selecting the node map(s) from UE 205, user interface system 245, and/or RTAS 255).

User interface system 245 may use the node map to generate navigation instructions. For example, as discussed above, the node map may include the likelihood that UE 205 would traverse a certain path between nodes, and/or travel from one node do another, and user interface system 245 may generate the navigation instructions using these likelihoods. In some embodiments, the navigation instructions may include annotations or other information, based on attributes of nodes. For example, if one of the nodes is associated with a wall hanging, the node map may include information indicating content of the wall hanging (or other visibly identifiable attributes of the wall hanging), and the navigation instructions may include some or all of the information associated with the wall hanging. User interface system 245 may proceed to provide the navigation instructions to UE 205, which may present the instructions in a GUI (e.g., as similarly shown in FIG. 1B). User interface system 245 may also notify PAIR 240 that navigation instructions were provided to UE 205, so that PAIR 240 can refine the node map based on how the UE 205 behaves after the navigation instructions are provided.

For example, UE 205 may communicate, in real-time or near-real-time, with RTAS 255 to provide information regarding UE 205 while navigation instructions are presented via UE 205. For instance, UE 205 may periodically or intermittently (e.g., every 5 seconds, every 30 seconds, every time a new navigation instruction is presented, etc.) provide status information to RTAS 255, such as location information, orientation information, video capture information, or the like. Additionally, or alternatively, UE 205 may receive user feedback (e.g., a selection indicating that a new route is desired, a rating of the navigation instructions, etc.).

RTAS 255 may provide some or all of the information, received from UE 205, to PAIR 240 and/or user interface system 245. PAIR 240 may, in some embodiments, refine the node map, and/or other information associated with the place, based on the information received from UE 205. In some embodiments, PAIR 240 may use machine learning, neural networks, artificial intelligence ("AI"), and/or other techniques to automatically refine the node map and/or information associated with the place. In some embodiments, PAIR 240 may refine a node map by adding nodes that were not previously present, or by removing nodes that were previously present. For example, if a new fixture is installed in a place, video information from one or more UEs 205 may reveal that the fixture has been installed, and PAIR 240 may add a node associated with the fixture.

In some embodiments, user interface system 245 may use the information, received from UE 205, to present different information via UE 205. For example, if user interface system 245 receives information indicating that UE 205 has moved from one place to another, user interface system 245 may automatically retrieve (e.g., from PAIR 240) one or more node maps associated with the new place. As another example, after UE 205 has completed a set of navigation instructions, user interface system 245 may request feedback on the quality of the instructions, and may pass the feedback to PAIR 240 to enable PAIR 240 to refine the node map(s) associated with the place. As mentioned above, different node maps may be associated with different attributes of users. When refining the node maps, PAIR 240 may, in some embodiments, only refine node maps with the same attributes of a user of UE 205. In some embodiments, PAIR 240 may obtain user information (e.g., demographics information, a telephone number, an address, user name, etc.) from a user profile repository, such as a device of a wireless telecommunications network (e.g., HSS/AAA server 235, UDM 350, and/or some other repository that stores information regarding users and/or UEs 205), in order to identify attributes of the user of UE 205.

Figure 8:
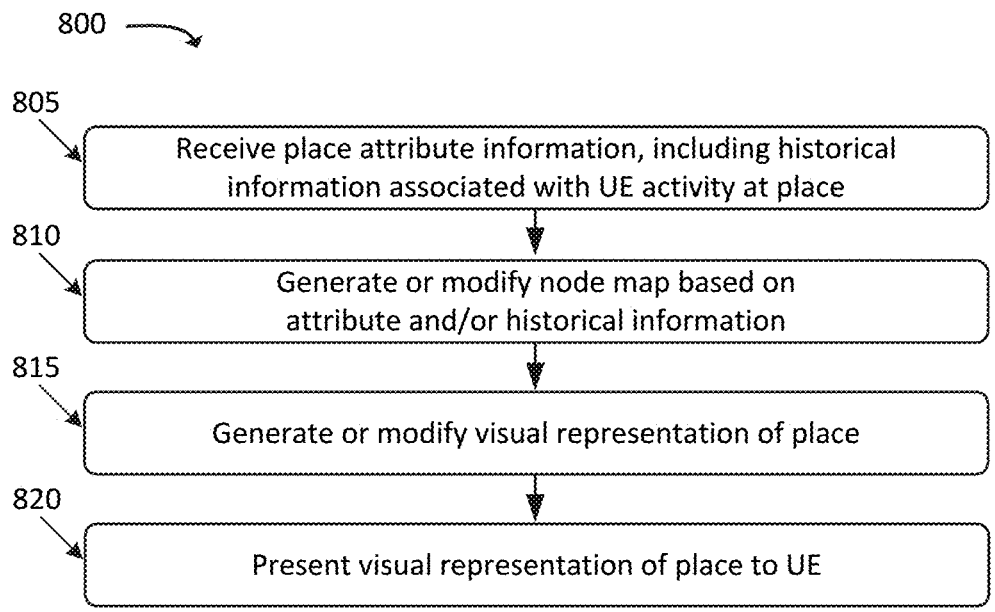
FIG. 8 illustrates an example process for obtaining and presenting attribute information associated with a particular place.

FIG. 8 illustrates an example process 800 for obtaining and presenting information associated with a particular place. In some embodiments, process 800 may be performed by PAIR 240. In some embodiments, some or all of process 800 may be performed by one or more devices in addition to, or in lieu of, PAIR 240 (e.g., user interface system 245 and/or one or more other devices described herein).

As shown, process 800 may include receiving (at 805) attribute information associated with a place, including historical information associated with UE activity at the place. For example, as described above (e.g., with respect to FIGS. 4 and 7), PAIR 240 may receive various types of information that can be useful in generating a node map and/or other data structure that represents the place. The information may include, for example, floor plan information, RF fingerprint information, geographical location information, and/or other types of information. PAIR 240 may, additionally, or alternatively, receive information from RTAS 255, which may include historical information from one or more UEs 205 (e.g., UEs 205 that have been physically present in, or within a threshold distance of, the place).

Process 800 may further include generating and/or modifying (at 810) a node map, for the place, based on the received attributes and/or historical information. For example, as discussed above (e.g., with respect to FIGS. 4 and 7), PAIR 240 may generate a node map for the place (e.g., if a node map has not already been generated for the place). In some embodiments, PAIR 240 may modify a node map associated with the place. As also discussed above, multiple node maps (or versions of the same node map) may be present (e.g., node maps that are associated with different time thresholds, different user types, etc.).

Process 800 may additionally include generating and/or modifying (at 815) a visual representation of the place. For example, PAIR 240 (and/or user interface system 245) may generate a visual representation by overlaying icons and/or other graphical elements on a floor plan of the place. The icons may each represent features of the place (e.g., one icon may represent a room, another icon may represent a door, another icon may represent a WiFi access point, and so on). In some embodiments, the visual representation may be generated each time the node map is generated and/or modified. In some embodiments, the visual representation may be generated when UE 205 requests the visual representation.

Process 800 may also include presenting (at 820) the visual representation of the place to a particular UE 205. For example, the visual representation may be provided to UE 205 based on a request from UE 205 (e.g., a request to view the place, a request to navigate to and/or from the place, etc.).

In some embodiments, the visual representation may be provided to UE 205 automatically (e.g., "pushed," without a request for the visual representation from UE 205). For example, PAIR 240 and/or user interface system 245 may determine (e.g., based on information received from RTAS 255 and/or some other source) that UE 205 is located within, or within a threshold distance of, the place. Additionally, or alternatively, PAIR 240 may determine that UE 205 is traveling towards the place (e.g., based on a current location, trajectory, and/or velocity of UE 205), and may automatically provide the visual representation of the place to UE 205 based on the determination that UE 205 is traveling towards the place. When receiving the visual representation automatically, UE 205 may, in some embodiments, cache the visual representation (e.g., store the visual representation without notifying a user of UE 205 that the visual representation has been received). The cached visual representation may be displayed on a display device of UE 205 when a user of UE 205 selects an option to view the visual representation. Since the visual representation is already cached, it may be presented to the user more quickly than if it had needed to be retrieved after the user requested to view it.

Figure 9:
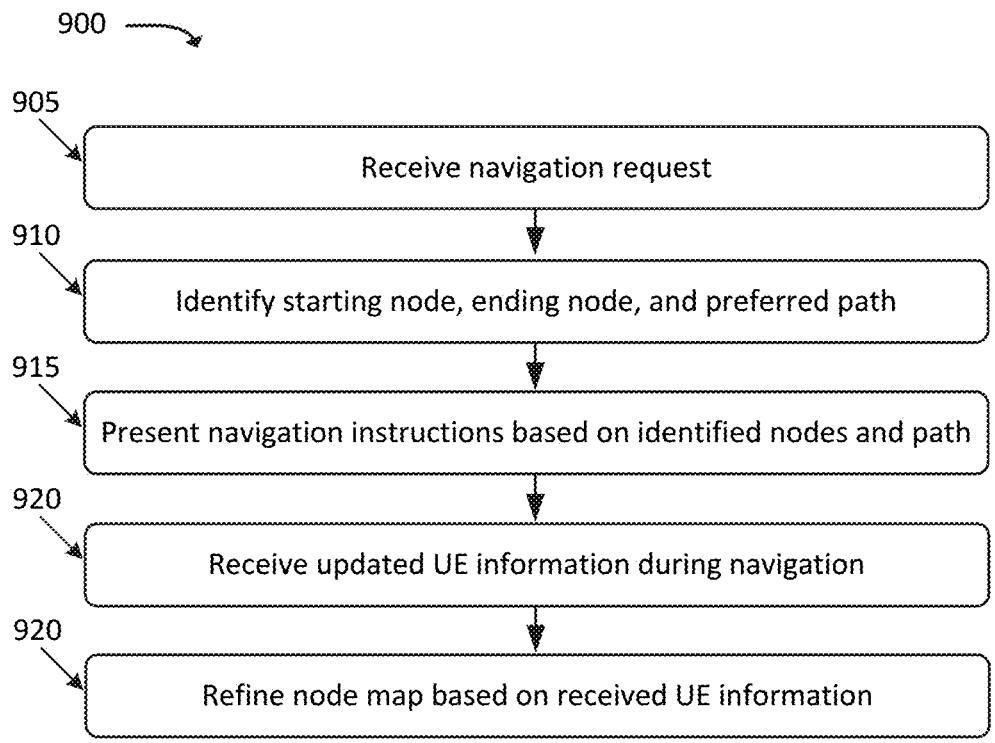
FIG. 9 illustrates an example process for assisting a user in navigating a place based on the node map and further based on real-time feedback from the user (e.g., from a UE of the user), in accordance with some embodiments.

FIG. 9 illustrates an example process 900 for assisting a user in navigating a place based on the node map and further based on real-time feedback from the user (e.g., from a UE of the user), in accordance with some embodiments. In some embodiments, process 900 may be performed by user interface system 245. In some embodiments, one or more other devices, in addition to or in lieu of user interface system 245, may perform some or all of process 900.

As shown, process 900 may include receiving (at 905) a navigation request. For example, user interface system 245 may receive a request from UE 205 to navigate from one point (e.g., a first point in a place) to another point (e.g., a second point in the place).

Process 900 may further include identifying (at 910) a starting node, an ending node, and a preferred path. For example, user interface system 245 may identify a nearest node, in the node map (e.g., a node map associated with the place, which may further be a node map that is associated with one or more attributes of a user of UE 205, such as demographics attributes), to a current location of UE 205. User interface system 245 may also identify a nearest node, in the node map, to the ending point of the navigation request. User interface system 245 may determine a path between the starting and ending nodes based on the node map. For example, user interface system 245 may analyze the likelihood of movement from each node to another node, and generate a path based on the analysis.

Process 900 may additionally include presenting (at 915) navigation instructions based on the identified nodes and path. For example, user interface system 245 may provide instructions, based on the path identified at 910, to UE 205. In some embodiments, the instructions may include annotations that are associated with one or more of the nodes in the path. For instance, as discussed above, one node may be associated with a door that has a keycode, and the instructions may include an annotation that includes the keycode.

Process 900 may also include receiving (at 920) updated UE information during the navigation. For example, RTAS 255 may receive information, associated with UE 205, after the navigation instructions have been provided to UE 205. The information may include, for example, location information, orientation information, etc. (e.g., as discussed above with respect to FIGS. 5 and 7).

Process 900 may further include refining (at 920) the node map based on the received information. For example, as discussed above, the node map may be refined based on factors such as whether the navigation instructions were followed (or a quantity or percentage of instructions that were followed, versus how many were not followed), whether the navigation was completed, whether new navigation instructions were requested, etc.

Figure 10:
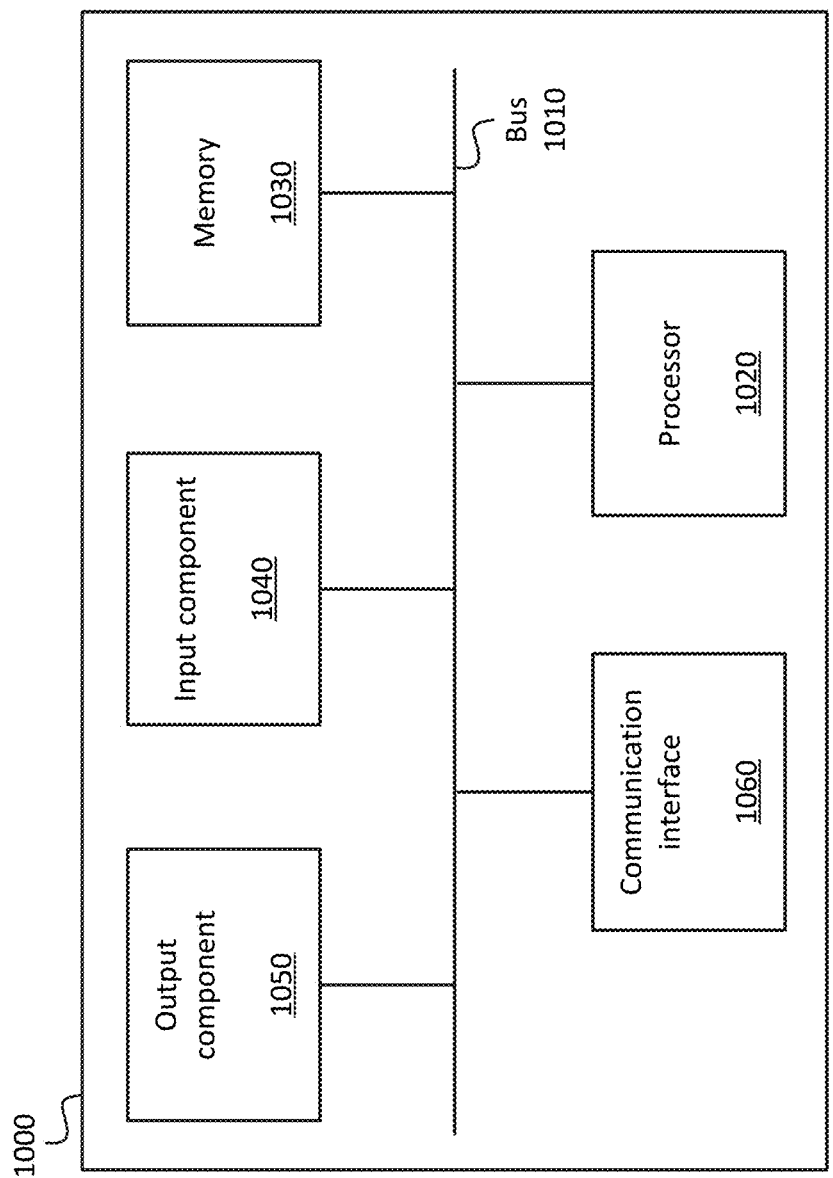
FIG. 10 illustrates example components of one or more devices, according to one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 7-9, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
    a non-transitory computer-readable medium storing a set of processor-executable instructions; and
    one or more processors configured to execute the set of processor-executable instructions, wherein executing the set of processor-executable instructions causes the one or more processors to:
        receive a node map associated with a particular area, wherein the node map includes a plurality of nodes that are each associated with a respective location within the particular area;
        determine, between each node in the node map and at least one other node in the node map, a likelihood that a particular user device, that is located in a location that is associated with the each node, will move to a location that is associated with the at least one other node;
        receive a request to navigate the particular user device from a first location, in the particular area, to a second location in the particular area;
        generate, based on the request and the determined likelihoods, navigation instructions from the first location to the second location; and
        output the generated navigation instructions.

2. The device of claim 1, wherein the likelihood, that the particular user device will move from a first node to a second node, of the plurality of nodes, is based on historical information associated with the particular user device.

3. The device of claim 1, wherein the likelihood, that the particular user device will move from a first node to a second node, of the plurality of nodes, is based on historical information associated with one or more other user devices.

4. The device of claim 1, wherein executing the processor-executable instructions further causes the one or more processors to:
generate a visual representation of the particular area, the visual representation including a graphical icon for each node, of the plurality of nodes;
receive information indicating that the particular user device is located within a threshold distance of a boundary of the particular area, and
output, based on the information indicating that the particular user device is located within the threshold distance of the boundary of the particular area, the visual representation of the particular area to the particular user device.

5. The device of claim 1, wherein executing the processor-executable instructions further causes the one or more processors to:
generate a visual representation of the particular area, the visual representation including a selectable graphical icon for at least one node, of the plurality of nodes;
output the visual representation of the particular area to the particular user device; and
receive a selection, from the particular user device, of a particular selectable graphical icon associated with a particular node, wherein the second location, indicated in the request, is associated with the selected particular node.

6. The device of claim 1, wherein the second location is associated with a particular room in the particular area, wherein executing the processor-executable instructions further causes the one or more processors to:
determine that the navigation instructions have been completed;
compare a route taken, during the navigation, to the navigation instructions;
determine that the route taken was different from the navigation instructions; and
modify at least one of the likelihoods, between at least two of the nodes in the node map, based on the route taken being different from the navigation instructions.

7. The device of claim 1, wherein executing the processor-executable instructions further causes the one or more processors to:
generate a plurality of node maps associated with the particular area, that each include the same nodes, for a plurality of different user devices,
wherein the respective likelihoods of traveling from a first node to a second node, of the plurality of nodes, are different for each one of the plurality of node maps.

8. The device of claim 1, wherein the likelihood that the user device will move from a location associated with a first node, of the plurality of nodes, to a location associated with a second node of the plurality of nodes is based on a percentage chance that the user device will move from the location associated with the first node to the location associated with the second node.

9. A non-transitory computer-readable medium storing a set of processor-executable instructions, which, when executed by one or more processors, cause the one or more processors to:
receive a node map associated with a particular area, wherein the node map includes a plurality of nodes that are each associated with a respective location within the particular area;
determine, between each node in the node map and at least one other node in the node map, a likelihood that a particular user device, that is located in a location that is associated with the each node, will move to a location that is associated with the at least one other node;
receive a request to navigate the particular user device from a first location, in the particular area, to a second location in the particular area;
generate, based on the request and the determined likelihoods, navigation instructions from the first location to the second location; and
output the generated navigation instructions.

10. The non-transitory computer-readable medium of claim 9, wherein the likelihood, that the particular user device will move from a first node to a second node, of the plurality of nodes, is based on historical information associated with the particular user device.

11. The non-transitory computer-readable medium of claim 9, wherein the likelihood, that the particular user device will move from a first node to a second node, of the plurality of nodes, is based on historical information associated with one or more other user devices.

12. The non-transitory computer-readable medium of claim 9, wherein execution of set of processor-executable instructions further causes the one or more processors to:
generate a visual representation of the particular area, the visual representation including a graphical icon for each node, of the plurality of nodes;
receive information indicating that the particular user device is located within a threshold distance of a boundary of the particular area, and
output, based on the information indicating that the particular user device is located within the threshold distance of the boundary of the particular area, the visual representation of the particular area to the particular user device.

13. The non-transitory computer-readable medium of claim 9, wherein execution of set of processor-executable instructions further causes the one or more processors to:
generate a visual representation of the particular area, the visual representation including a selectable graphical icon for at least one node, of the plurality of nodes;
output the visual representation of the particular area to the particular user device; and
receive a selection, from the particular user device, of a particular selectable graphical icon associated with a particular node, wherein the second location, indicated in the request, is associated with the selected particular node.

14. The non-transitory computer-readable medium of claim 9, wherein the second location is associated with a particular room in the particular area, wherein execution of set of processor-executable instructions further causes the one or more processors to:
determine that the navigation instructions have been completed;
compare a route taken, during the navigation, to the navigation instructions;
determine that the route taken was different from the navigation instructions; and
modify at least one of the likelihoods, between at least two of the nodes in the node map, based on the route taken being different from the navigation instructions.

15. The non-transitory computer-readable medium of claim 9, wherein execution of set of processor-executable instructions further causes the one or more processors to:
generate a plurality of node maps associated with the particular area, that each include the same nodes, for a plurality of different user devices, wherein the respective likelihoods of traveling from a first node to a second node, of the plurality of nodes, are different for each one of the plurality of node maps.

16. A method, comprising:

receiving a node map associated with a particular area, wherein the node map includes a plurality of nodes that are each associated with a respective location within the particular area;

determining, between each node in the node map and at least one other node in the node map, a likelihood that a particular user device, that is located in a location that is associated with the each node, will move to a location that is associated with the at least one other node;

receiving a request to navigate the particular user device from a first location, in the particular area, to a second location in the particular area;

generating, based on the request and the determined likelihoods, navigation instructions from the first location to the second location; and outputting the generated navigation instructions via one or more display devices.

17. The method of claim 16, wherein the likelihood, that the particular user device will move from a first node to a second node, of the plurality of nodes, is based on:

historical information associated with the particular user device, and historical information associated with one or more other user devices.

18. The method of claim 16, further comprising:

generating a visual representation of the particular area, the visual representation including a graphical icon for each node, of the plurality of nodes;

receiving information indicating that the particular user device is located within a threshold distance of a boundary of the particular area, and outputting, based on the information indicating that the particular user device is located within the threshold distance of the boundary of the particular area, the visual representation of the particular area to the particular user device.

19. The method of claim 16, further comprising:

generating a visual representation of the particular area, the visual representation including a selectable graphical icon for at least one node, of the plurality of nodes;

outputting the visual representation of the particular area to the particular user device; and receiving a selection, from the particular user device, of a particular selectable graphical icon associated with a particular node, wherein the second location, indicated in the request, is associated with the selected particular node.

20. The method of claim 16, wherein the second location is associated with a particular room in the particular area, the method further comprising:

determining that the navigation instructions have been completed;

comparing a route taken, during the navigation, to the navigation instructions;

determining that the route taken was different from the navigation instructions; and modifying at least one of the likelihoods, between at least two of the nodes in the node map, based on the route taken being different from the navigation instructions.

* * * * *